(12) United States Patent
Sumikawa

(10) Patent No.: US 10,777,826 B2
(45) Date of Patent: Sep. 15, 2020

(54) FUEL CELL SYSTEM

(71) Applicant: Toyota Jidosha Kabushiki Kaisha, Toyota-shi Aichi-ken (JP)

(72) Inventor: Hiroki Sumikawa, Nisshin Aichi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 136 days.

(21) Appl. No.: 16/209,283

(22) Filed: Dec. 4, 2018

(65) Prior Publication Data

US 2019/0181466 A1 Jun. 13, 2019

(30) Foreign Application Priority Data

Dec. 8, 2017 (JP) .................. 2017-236245

(51) Int. Cl.
| | | |
|---|---|---|
| *H01M 8/04* | (2016.01) | |
| *H01M 8/04089* | (2016.01) | |
| *B60L 3/00* | (2019.01) | |
| *B60L 50/71* | (2019.01) | |
| *B60L 58/34* | (2019.01) | |
| *B60L 50/72* | (2019.01) | |

(Continued)

(52) U.S. Cl.
CPC ....... *H01M 8/04089* (2013.01); *B60L 3/0053* (2013.01); *B60L 50/71* (2019.02); *B60L 50/72* (2019.02); *B60L 58/32* (2019.02); *B60L 58/34* (2019.02); *H01M 8/04197* (2016.02); *H01M 8/04201* (2013.01); *B60Y 2400/202* (2013.01); *H01M 2250/20* (2013.01)

(58) Field of Classification Search
CPC ......... H01M 8/04089; H01M 8/04197; H01M 8/04201; H01M 2250/20; B60L 50/72; B60L 50/71; B60L 58/34; B60L 58/32; B60L 3/0053; B60Y 2400/202
See application file for complete search history.

(56) References Cited

U.S. PATENT DOCUMENTS

| | | | |
|---|---|---|---|
| 2002/0187380 A1 | 12/2002 | Tanaka et al. | |
| 2002/0189873 A1 | 12/2002 | Mizuno | |

(Continued)

FOREIGN PATENT DOCUMENTS

| | | | |
|---|---|---|---|
| CA | 2958391 A1 | 8/2017 | |
| JP | 2002367647 A | 12/2002 | |

(Continued)

*Primary Examiner* — Raymond Alejandro
(74) *Attorney, Agent, or Firm* — Dinsmore & Shohl LLP

(57) ABSTRACT

A fuel cell system that ensures restraining a pressure relief mechanism from scattering is provided. The fuel cell system includes: a housing case that includes a stack housing portion housing a fuel cell stack and a high voltage component housing portion housing a high voltage component; a front side pressure relief mechanism, a left side pressure relief mechanism, a rear side pressure relief mechanism, a right side pressure relief mechanism, and an upper side pressure relief mechanism disposed on the high voltage component housing portion; and an auxiliary machine disposed outside the high voltage component housing portion. The respective pressure relief mechanisms are disposed in positions opposed to the auxiliary machine so as to have clearances with the auxiliary machine, and have rigidities lower than the rigidity of the auxiliary machine.

4 Claims, 4 Drawing Sheets

(51) Int. Cl.
*H01M 8/04082* (2016.01)
*B60L 58/32* (2019.01)

(56) References Cited

U.S. PATENT DOCUMENTS

| | | | |
|---|---|---|---|
| 2008/0090122 A1* | 4/2008 | Andreas-Schott | H01M 8/04089 429/434 |
| 2009/0197141 A1* | 8/2009 | Nakakubo | H01M 8/04231 429/413 |
| 2010/0209797 A1 | 8/2010 | Katano et al. | |
| 2014/0017581 A1* | 1/2014 | Drouhault | H01M 8/04044 429/413 |
| 2014/0166121 A1* | 6/2014 | Jung | F17C 13/002 137/154 |
| 2016/0137099 A1 | 5/2016 | Takeshita et al. | |
| 2016/0190632 A1 | 6/2016 | Itoga | |
| 2017/0101031 A1 | 4/2017 | Ohashi | |
| 2017/0222250 A1 | 8/2017 | Naito | |
| 2017/0250435 A1 | 8/2017 | Katano et al. | |

FOREIGN PATENT DOCUMENTS

| | | |
|---|---|---|
| JP | 2002370544 A | 12/2002 |
| JP | 2005149732 A | 6/2005 |
| JP | 2008130446 A | 6/2008 |
| JP | 2010177083 A | 8/2010 |
| JP | 5398214 B2 | 1/2014 |
| JP | 2016122502 A | 7/2016 |
| JP | 201774819 A | 4/2017 |
| JP | 6156329 B2 | 7/2017 |
| JP | 2017135073 A | 8/2017 |
| JP | 2017-168276 A | 9/2017 |
| KR | 20170101129 A | 9/2017 |

* cited by examiner

FUEL CELL SYSTEM

CROSS REFERENCE TO RELATED APPLICATIONS

The present application claims priority from Japanese patent application JP 2017-236245 filed on Dec. 8, 2017, the content of which is hereby incorporated by reference into this application.

BACKGROUND

Technical Field

The present disclosure relates to a fuel cell system including a fuel cell stack.

Background Art

Conventionally, as a technique in such a field, there has been known a fuel cell system mounted on a vehicle as described in, for example, JP 2017-74819 A. In the fuel cell system described in JP 2017-74819 A, a fuel cell stack and an auxiliary machine, such as a boost converter and an inverter, are mounted in a front compartment in a front side of a vehicle. The fuel cell stack, the boost converter, and the inverter are stacked in this order from the bottom.

SUMMARY

In a fuel cell system having such a structure, it has been examined to reduce the number of components by eliminating a partition member between a stack case that houses the fuel cell stack and a high voltage component case that houses, for example, a boost converter, and thus, integrating these cases. However, integrating the stack case and the high voltage component case causes a gas to pass through between the stack case and the high voltage component case. If by any chance hydrogen leaks from the fuel cell stack due to any cause, it is possible that the leaked hydrogen accumulates in an upper side of the high voltage component case. In order to avoid an inconvenience caused by the hydrogen accumulation, it is possible to, for example, dispose a pressure relief mechanism in the high voltage component case to relieve a pressure by deforming the pressure relief mechanism when the pressure exceeds a predetermined pressure. However, this causes a new problem that the deformed pressure relief mechanism scatters when the pressure relief mechanism deforms in a state where a hood that covers the front compartment is opened.

The present disclosure has been made to solve such a technical problem and provides a fuel cell system that ensures restraining a pressure relief mechanism from scattering.

A fuel cell system according to the present disclosure is a fuel cell system including a fuel cell stack. The fuel cell system includes a housing case, a pressure relief mechanism, and an auxiliary machine. The housing case includes a stack housing portion and a high voltage component housing portion. The stack housing portion houses the fuel cell stack. The high voltage component housing portion houses a high voltage component coupled to the fuel cell stack. The high voltage component housing portion is disposed above the stack housing portion. The high voltage component housing portion is configured to allow a gas to pass through between the high voltage component housing portion and the stack housing portion. The pressure relief mechanism is disposed on the high voltage component housing portion of the housing case. The pressure relief mechanism is formed of a material having a rigidity lower than the rigidity of the high voltage component housing portion. The auxiliary machine is disposed outside the high voltage component housing portion of the housing case. The pressure relief mechanism is disposed in a position opposed to the auxiliary machine so as to have a clearance with the auxiliary machine, and has a rigidity lower than the rigidity of the auxiliary machine.

In the fuel cell system according to the present disclosure, the pressure relief mechanism is disposed on the high voltage component housing portion of the housing case. Therefore, if by any chance an inconvenience is caused by an accumulated hydrogen inside the high voltage component housing portion, the pressure relief mechanism deforms before the high voltage component housing portion does, and thus, a pressure inside the high voltage component housing portion is configured to be relieved outside, thus ensuring the reduced deforming and breaking of the high voltage component housing portion. The pressure relief mechanism is disposed in the position opposed to the auxiliary machine so as to have a clearance with the auxiliary machine, and has a rigidity lower than the rigidity of the auxiliary machine such that the pressure relief mechanism can be restrained from scattering using the auxiliary machine. Moreover, since the auxiliary machine thus doubles as a member to restrain the pressure relief mechanism from scattering, the increase of components can be suppressed.

In the fuel cell system according to the present disclosure, the high voltage component housing portion may include pedestals for the auxiliary machine, and the pedestals may be disposed so as to surround the pressure relief mechanism in a plan view. Accordingly, the auxiliary machine can be disposed around the pressure relief mechanism so as to surround the pressure relief mechanism, and therefore, the auxiliary machine can be used to restrain the pressure relief mechanism from scattering in a lateral direction.

In the fuel cell system according to the present disclosure, a wire harness may be used as the auxiliary machine. The wire harness is disposed so as to surround the pressure relief mechanism in a plan view. Accordingly, the wire harness disposed around the pressure relief mechanism can be used to restrain the pressure relief mechanism from scattering in the lateral direction.

In the fuel cell system according to the present disclosure, the pressure relief mechanism may be a hydrogen ventilation opening having a hydrogen permeable membrane. Accordingly, the pressure relief mechanism doubling as a function of the hydrogen ventilation opening ensures the suppressed increase of the number of components.

The present disclosure ensures restraining the pressure relief mechanism from scattering.

DETAILED DESCRIPTION

The following describes an embodiment of a fuel cell system according to the present disclosure with reference to the drawings. In each drawing, an arrow FR, an arrow RH, and an arrow UP indicate a vehicle front side, a vehicle right side, and a vehicle upper side, respectively. While in the following embodiment, a description will be given of an example where the fuel cell system is mounted on a vehicle to serve as a driving source of the vehicle, the fuel cell system of the present disclosure may serve as a driving source of, for example, a ship, an aircraft, and a train, and a power generation facility of a building.

Figure 1:
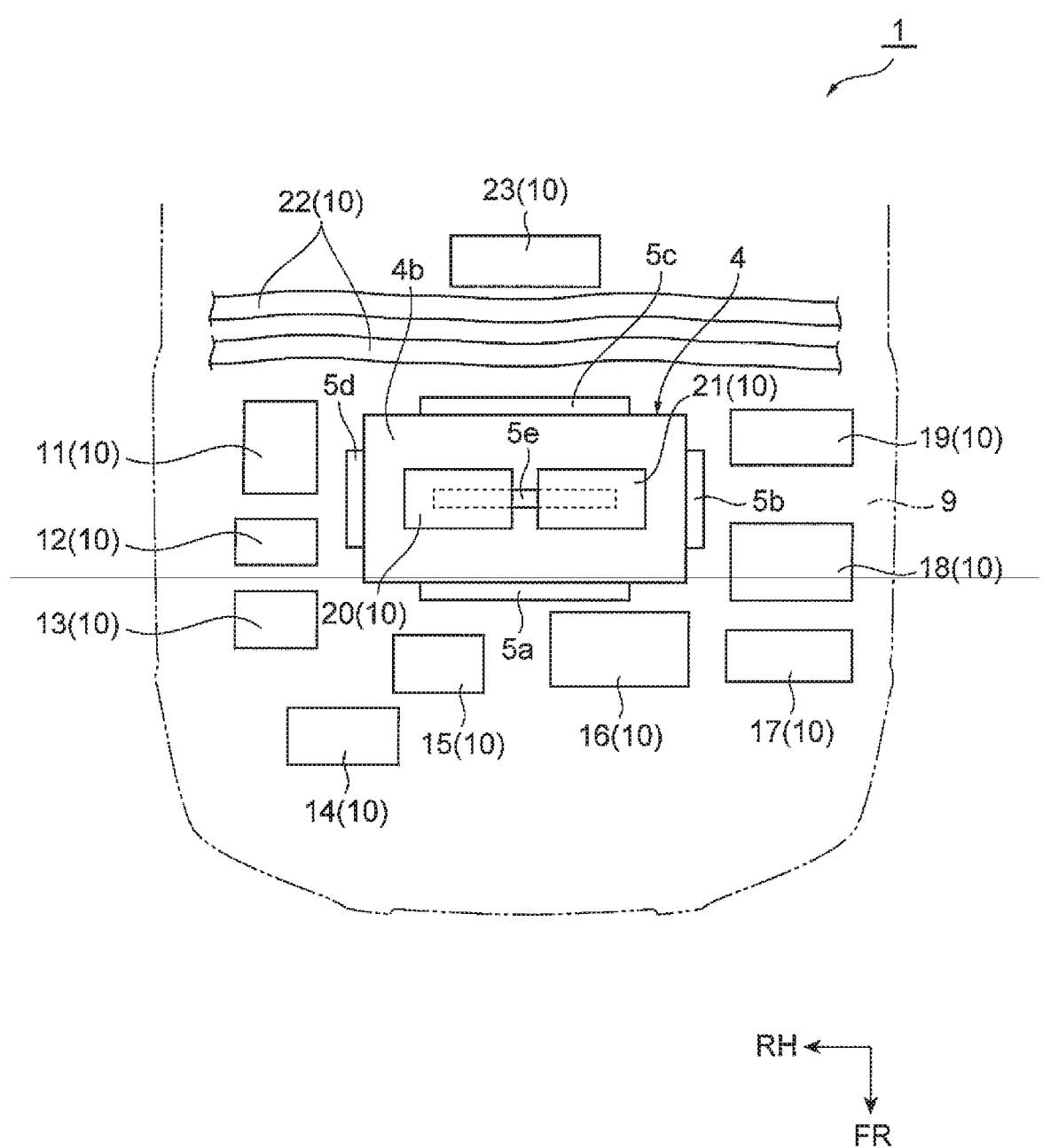
FIG. 1 is a schematic plan view illustrating a fuel cell system according to an embodiment.
Figure 2:
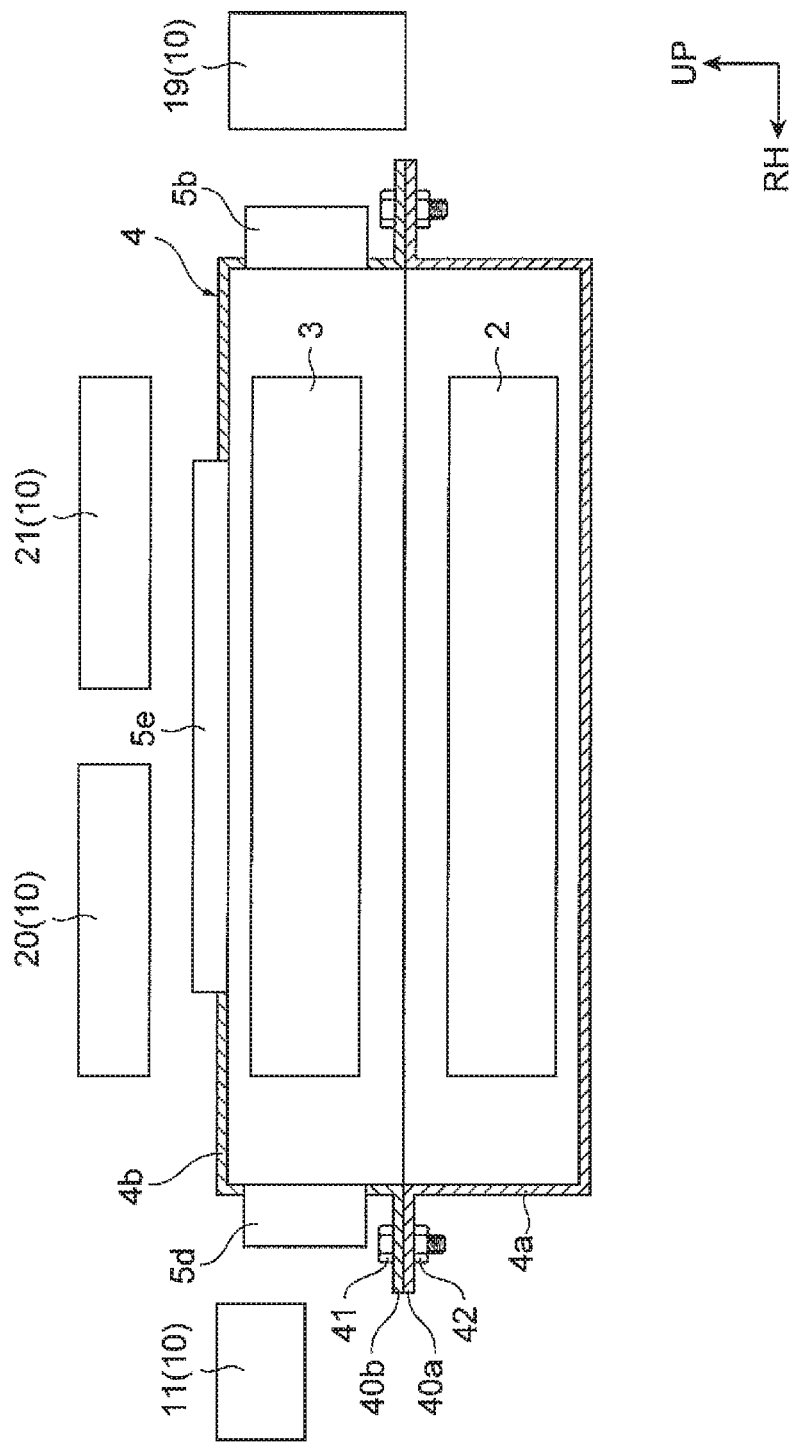
FIG. 2 is a partially schematic front view illustrating the fuel cell system according to the embodiment.

FIG. 1 is a schematic plan view illustrating a fuel cell system according to the embodiment. FIG. 2 is a partially schematic front view illustrating the fuel cell system according to the embodiment. In FIG. 2, a housing case is illustrated in a cross-sectional view for illustrating the positions of a fuel cell stack and a high voltage component, which are internally housed in the housing case, and auxiliary machines other than a power control unit, a rotary valve, a hydrogen gas supply unit, and a water heating heater are omitted. A fuel cell system 1 of this embodiment mainly includes a housing case 4 and auxiliary machines 10. The housing case 4 is mounted in an approximately central position of a front compartment 9 of a vehicle. The auxiliary machines 10 are disposed outside the housing case 4 so as to surround the housing case 4.

The housing case 4 is an approximately rectangular parallelepiped shaped casing formed of, for example, a metallic material. The housing case 4 includes a stack housing portion 4a and a high voltage component housing portion 4b. The stack housing portion 4a is disposed in a lower portion to house a fuel cell stack 2. The high voltage component housing portion 4b is disposed above the stack housing portion 4a to house a high voltage component 3. The stack housing portion 4a and the high voltage component housing portion 4b provide, for example, approximately rectangular parallelepiped shaped casings having respective openings and flange portions and internally include securing portions that secure the fuel cell stack 2 or the high voltage component 3. The housing case 4 is integrally formed by fastening flange portions 40a and 40b with a bolt 41 and a nut 42 while the casing constituting the stack housing portion 4a and the casing constituting the high voltage component housing portion 4b being butted together such that the openings face one another (see FIG. 2). It should be noted that a gas can pass through between the stack housing portion' 4a and the high voltage component housing portion 4b.

The fuel cell stack 2 is a cell stack formed by stacking a plurality of single cells and constitutes a solid polymer electrolyte fuel cell. Although it is not illustrated, the single cell includes a membrane electrode assembly formed by an anode electrode and a cathode electrode sandwiching a polymer electrolyte membrane and a pair of separators that sandwich the membrane electrode assembly from both sides. Meanwhile, the high voltage component 3 is, for example, a boost converter for boosting an electric power of the fuel cell stack 2 and is electrically coupled to the fuel cell stack 2.

The auxiliary machines 10 include, for example, a power control unit 11, an external power feeding unit 12, an air duct 13, an EV reserve tank 14, an FC reserve tank 15, an ion exchanger 16, a relay box 17, a battery 18, a rotary valve 19, a hydrogen gas supply unit 20, a water heating heater 21, a wire harness 22, and a three-way valve 23, which are disposed inside the front compartment 9.

As illustrated in FIG. 1, the power control unit 11, the external power feeding unit 12, and the air duct 13 are disposed in this order from the vehicle rear side to the front side on the right side of the high voltage component housing portion 4b. The power control unit 11 is a unit to control, for example, an electric power transmitted to each unit constituting the fuel cell system 1. The external power feeding unit 12 is a unit to supply an electric power from the fuel cell stack 2 and a secondary battery (not illustrated) to an external load. The air duct 13 is a construction for taking in an external air supplied to the fuel cell stack 2.

The EV reserve tank 14, the FC reserve tank 15, and the ion exchanger 16 are disposed in this order from the vehicle right side to the left side on the front side of the high voltage component housing portion 4b. The EV reserve tank 14 is a tank that retains a coolant for cooling a generated heat of the battery 18. The FC reserve tank 15 is a tank that retains a coolant for cooling a generated heat of the fuel cell. The ion exchanger 16 is a device that removes ions included in the coolant for cooling the fuel cell.

The relay box 17, the battery 18, and the rotary valve 19 are disposed in this order from the vehicle front side to the rear side on the left side of the high voltage component housing portion 4b. The relay box 17 packs relays that perform a supply control (ON/OFF control) of the electric power supplied from the fuel cell stack 2, the battery 18, and the like to a driving motor (not illustrated) and various kinds of electric components. The battery 18 is a power source for driving each of the auxiliary machines. The rotary valve 19 is a valve device, for example, for adjusting the flow rate of the coolant in each circulation passage of the coolant.

As illustrated in FIG. 2, the hydrogen gas supply unit 20 and the water heating heater 21 are disposed on the upper side of the high voltage component housing portion 4b. The hydrogen gas supply unit 20 is positioned on the right side of the water heating heater 21. A plurality of the wire harnesses 22 used in coupling each of the auxiliary machines 10 and the three-way valve 23 are disposed on the rear side of the high voltage component housing portion 4b. The wire harness 22 is disposed to extend along a right-left direction of the vehicle.

The fuel cell system 1 of this embodiment includes a plurality (five in this embodiment) of pressure relief mechanisms that is disposed in the high voltage component housing portion 4b and is formed of a material having a rigidity lower than that of the high voltage component housing portion 4b. As illustrated in FIG. 1, the respective five pressure relief mechanisms (that is, a front side pressure relief mechanism 5a, a left side-pressure relief mechanism 5b, a rear side pressure relief mechanism 5c, a right side pressure relief mechanism 5d, and an upper side pressure relief mechanism 5e) are disposed on front, left, rear, and right sidewalls and a ceiling of the high voltage component housing portion 4b.

Specifically, the front side pressure relief mechanism 5a is disposed on the front side wall of the high voltage component housing portion 4b. The front side pressure relief mechanism 5a is, for example, disposed in a position opposed to the EV reserve tank 14, the FC reserve tank 15, and the ion exchanger 16 so as to have respective clearances with the EV reserve tank 14, the FC reserve tank 15, and the ion exchanger 16, which are disposed on the front side of the front side pressure relief mechanism 5a. It should be noted that the front side pressure relief mechanism 5a is not necessarily disposed in the position opposed to all the EV reserve tank 14, the FC reserve tank 15, and the ion exchanger 16, and it is only necessary that the front side pressure relief mechanism 5a is disposed in a position opposed to at least one of the EV reserve tank 14, the FC reserve tank 15, or the ion exchanger 16. For example, the front side pressure relief mechanism 5a may be disposed in a position opposed to the ion exchanger 16 only.

The left side pressure relief mechanism 5b is disposed on the left side wall of the high voltage component housing portion 4b. The left side pressure relief mechanism 5b is, for example, disposed in a position opposed to the battery 18 and the rotary valve 19 so as to have respective clearances with the battery 18 and the rotary valve 19 disposed on the left side of the left side pressure relief mechanism 5b. It should be noted that the left side pressure relief mechanism 5b is not necessarily disposed in the position opposed to both the battery 18 and the rotary valve 19, and the left side pressure relief mechanism 5b may be disposed in a position opposed to any one of the battery 18 or the rotary valve 19. As illustrated in FIG. 1, while the left side pressure relief mechanism 5b is not disposed in a position opposed to the relay box 17 adjacent to a corner portion of the high voltage component housing portion 4b, the left side pressure relief mechanism 5b may be disposed in a position that further opposes the relay box 17, for example, when the relay box 17 is brought close to the left side wall of the high voltage component housing portion 4b.

The rear side pressure relief mechanism 5c is disposed on the rear side wall of the high voltage component housing portion 4b. The rear side pressure relief mechanism 5c is, for example, disposed in a position opposed to the wire harness 22 and the three-way valve 23 so as to have respective clearances with the wire harness 22 and the three-way valve 23 disposed on the rear side of the rear side pressure relief mechanism 5c. The wire harness 22 is disposed between the high voltage component housing portion 4b and the three-way valve 23, and is disposed to extend in the right-left direction of the vehicle.

The right side pressure relief mechanism 5d is disposed on the right side wall of the high voltage component housing portion 4b. The right side pressure relief mechanism 5d is, for example, disposed in a position opposed to the power control unit 11 and the external power feeding unit 12 so as to have respective clearances with the power control unit 11 and the external power feeding unit 12 disposed on the right side of the right side pressure relief mechanism 5d. It should be noted that the right side pressure relief mechanism 5d is not necessarily disposed in a position opposed to both the power control unit 11 and the external power feeding unit 12, and the right side pressure relief mechanism 5d may be disposed in a position opposed to any one of the power control unit 11 or the external power feeding unit 12. As illustrated in FIG. 1, while the right side pressure relief mechanism 5d is not disposed in a position opposed to the air duct 13 adjacent to a corner portion of the high voltage component housing portion 4b, the right side pressure relief mechanism 5d may be disposed in a position that further opposes the air duct 13, for example, when the air duct 13 is brought close to the right side wall of the high voltage component housing portion 4b.

Furthermore, the upper side pressure relief mechanism 5e is disposed on the ceiling of the high voltage component housing portion 4b. The upper side pressure relief mechanism 5e is disposed in a position opposed to the hydrogen gas supply unit 20 and the water heating heater 21 so as to have respective clearances with the hydrogen gas supply unit 20 and the water heating heater 21. It should be noted that the upper side pressure relief mechanism 5e is not necessarily disposed in a position opposed to both the hydrogen gas supply unit 20 and the water heating heater 21, and the upper side pressure relief mechanism 5e may be disposed in a position opposed to any one of the hydrogen gas supply unit 20 or the water heating heater 21.

Here, while a description will be given of an installation structure of the water heating heater 21 and a positional relationship of the water heating heater 21 with the upper side pressure relief mechanism 5e using the water heating heater 21 as an example, an installation structure of the hydrogen gas supply unit 20 and a positional relationship of the hydrogen gas supply unit 20 with the upper side pressure relief mechanism 5e are similar to those of the water heating heater 21, and thus, the repeated explanations are omitted.

Figure 3:
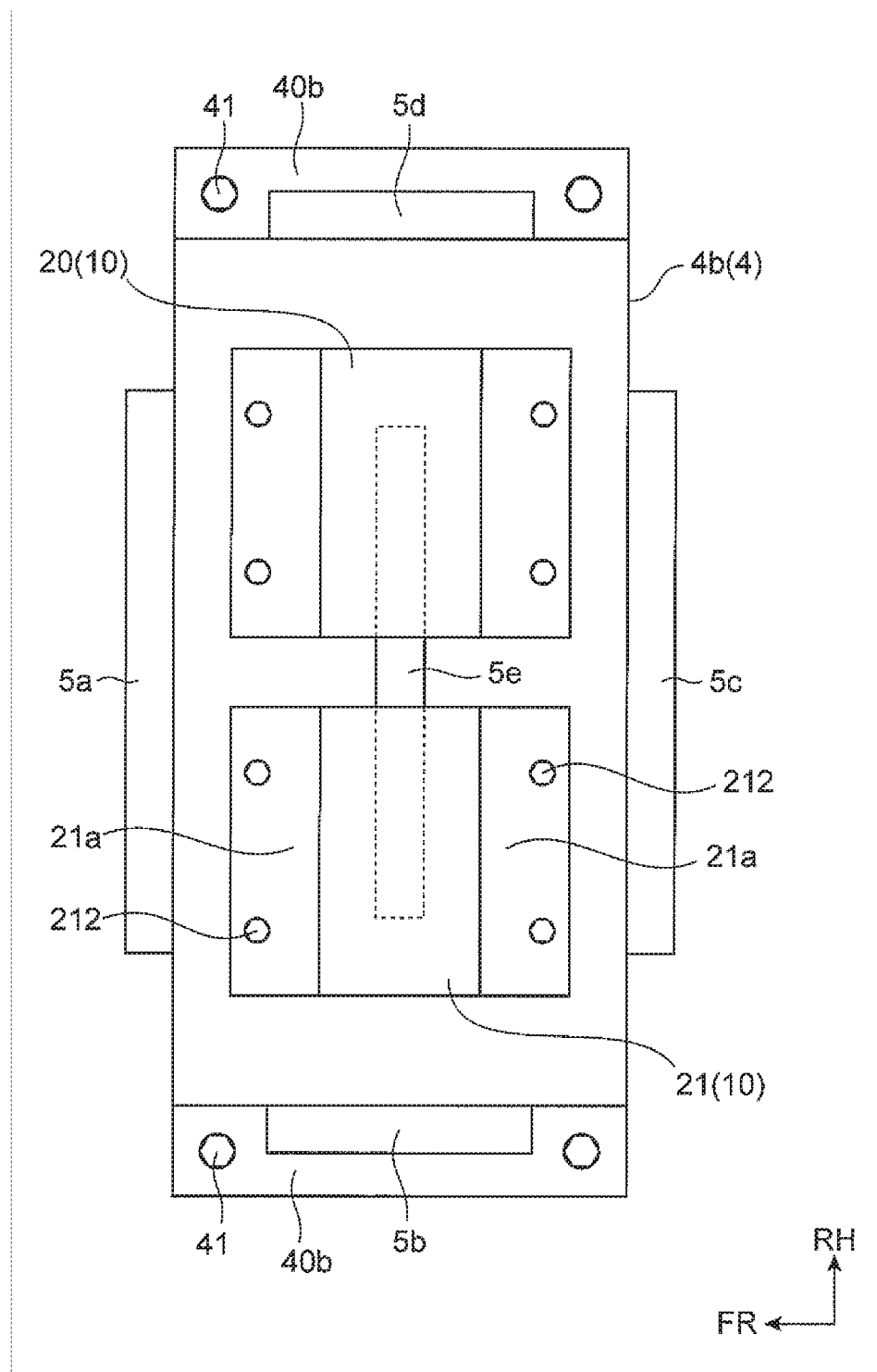
FIG. 3 is a plan view illustrating an upper side pressure relief mechanism and a water heating heater disposed on a ceiling of a high voltage component housing portion.
Figure 4:
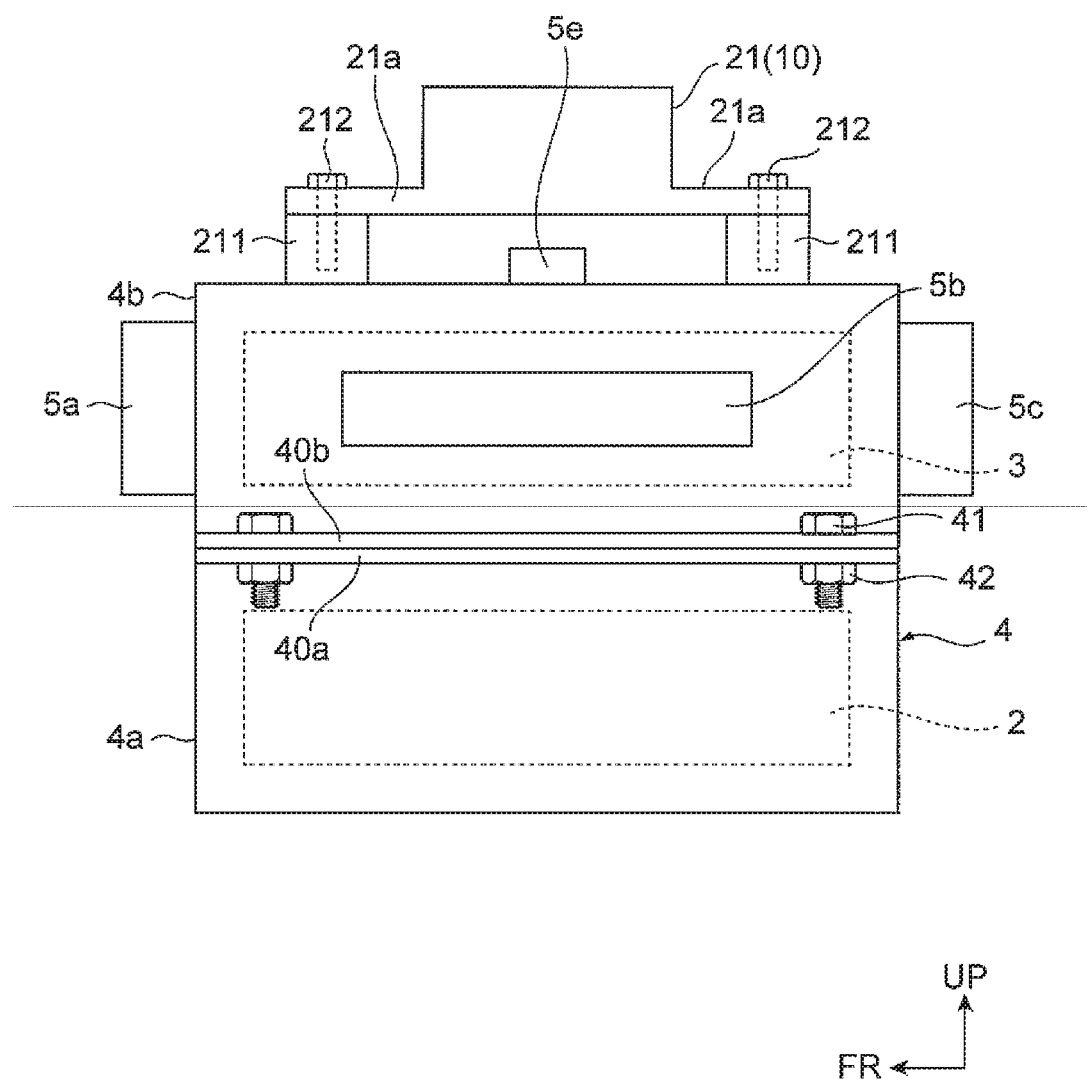
FIG. 4 is a side view illustrating the upper side pressure relief mechanism and the water heating heater disposed on the ceiling of the high voltage component housing portion.

FIG. 3 is a plan view illustrating the upper side pressure relief mechanism and the water heating heater disposed on the ceiling of the high voltage component housing portion. FIG. 4 is a side view illustrating the upper side pressure relief mechanism and the water heating heater disposed on the ceiling of the high voltage component housing portion. As illustrated in FIG. 3 and FIG. 4, four water heating heater pedestals 211 are disposed on an external wall of the ceiling (that is, an upper surface of the ceiling) of the high voltage component housing portion 4b. These water heating heater pedestals 211 are, for example, iron blocks internally having screw holes. The water heating heater pedestals 211 are disposed at positions corresponding to four corners of a flange portion 21a (described later) of the water'heating heater 21 and secured to the ceiling of the high voltage component housing portion 4b by, for example, welding.

Meanwhile, the water heating heater 21 is disposed above the upper side pressure relief mechanism 5e in a state where a bottom surface of the water heating heater 21 is separated from the upper side pressure relief mechanism 5e with a predetermined distance therebetween (in other words, has a clearance with the upper side pressure relief mechanism 5e). The water heating heater 21 is secured to the water heating heater pedestals 211 with bolts 212 in a state where the flange portions 21a disposed in a bottom portion of the water heating heater 21 are placed on the water heating heater pedestals 211.

In this embodiment, the front side pressure relief mechanism 5a, the left side pressure relief mechanism 5b, the rear side pressure relief mechanism 5c, the right side pressure relief mechanism 5d, and the upper side pressure relief mechanism 5e are hydrogen ventilation openings including respective hydrogen permeable membranes and are formed by attaching the hydrogen permeable membranes to openings provided at predetermined positions of the front, left, rear, and right sidewalls or the ceiling of the high voltage component housing portion 4b. The hydrogen permeable membrane is made of a material that blocks transmission of water, dust, and the like, while permitting transmission of hydrogen. In addition, each of these pressure relief mechanisms is formed of a material having a rigidity lower than that of the high voltage component housing portion 4b and a rigidity lower than that of each of the auxiliary machines 10.

In the fuel cell system 1 of this embodiment, the pressure relief mechanisms (the front side pressure relief mechanism 5a, the left side pressure relief mechanism 5b, the rear side pressure relief mechanism 5c, the right side pressure relief mechanism 5d, and the upper side pressure relief mechanism 5e) are disposed on the respective front, left, rear, and right sidewalls and ceiling of the high voltage component housing portion 4b, and these pressure relief mechanisms are formed of the material having the rigidity lower than that of the high voltage component housing portion 4b. In view of this, if by any chance an inconvenience is caused by an accumulated hydrogen inside the high voltage component housing portion 4b, the pressure relief mechanisms deform before the high voltage component housing portion 4b does, and thus, a pressure inside the high voltage component housing portion 4b can be relieved outside, thereby ensuring the reduced deforming, breaking, and the like of the high voltage component housing portion 4b.

In addition, the front side pressure relief mechanism 5a is disposed at the position opposed to the FC reserve tank 15 and the ion exchanger 16 so as to have the clearances with the FC reserve tank 15 and the ion exchanger 16 disposed on the front side of the front side pressure relief mechanism 5a, and has the rigidity lower than that of each of the FC reserve tank 15 and the ion exchanger 16. Accordingly, if by any chance the front side pressure relief mechanism 5a deforms and scatters, the FC reserve tank 15 and the ion exchanger 16 restrain a forward scattering of the front side pressure relief mechanism 5a. The FC reserve tank 15 and the ion exchanger 16 double as members to restrain the forward scattering of the front side pressure relief mechanism 5a, thus ensuring the suppressed increase of components.

The left side pressure relief mechanism 5b is disposed in the position opposed to the battery 18 and the rotary valve 19 so as to have the clearances with the battery 18 and the rotary valve 19 disposed on the left side of the left side pressure relief mechanism 5b, and has the rigidity lower than that of each of the battery 18 and the rotary valve 19. Accordingly, if by any chance the left side pressure relief mechanism 5b deforms and scatters, the battery 18 and the rotary valve 19 restrain a leftward scattering of the left side pressure relief mechanism 5b. The battery 18 and the rotary valve 19 double as members to restrain the leftward scattering of the left side pressure relief mechanism 5b, thus ensuring the suppressed increase of components.

The rear side pressure relief mechanism 5c is disposed in the position opposed to the wire harness 22 and the three-way valve 23 so as to have the clearances with the wire harness 22 and the three-way valve 23 disposed on the rear side of the rear side pressure relief mechanism 5c, and has the rigidity lower than that of each of the wire harness 22 and the three-way valve 23. Accordingly, if by any chance the rear side pressure relief mechanism 5c deforms and scatters, the wire harness 22 and the three-way valve 23 restrain a backward scattering of the rear side pressure relief mechanism 5c. The wire harness 22 and the three-way valve 23 double as members to restrain the backward scattering of the rear side pressure relief mechanism 5c, thus ensuring the suppressed increase of components.

The right side pressure relief mechanism 5d is disposed in the position opposed to the power control unit 11 and the external power feeding unit 12 so as to have the clearances with the power control unit 11 and the external power feeding unit 12 disposed on the right side of the right side pressure relief mechanism 5d, and has the rigidity lower than that of each of the power control unit 11 and the external power feeding unit 12. Accordingly, if by any chance the right side pressure relief mechanism 5d deforms and scatters, the power control unit 11 and the external power feeding unit 12 restrain a rightward scattering of the right side pressure relief mechanism 5d. The power control unit 11 and the external power feeding unit 12 double as members to restrain the rightward scattering of the right side pressure relief mechanism 5d, thus ensuring the suppressed increase of components.

The upper side pressure relief mechanism 5e is disposed in the position opposed to the hydrogen gas supply unit 20 and the water heating heater 21 so as to have the clearances with the hydrogen gas supply unit 20 and the water heating heater 21, and has the rigidity lower than that of each of the hydrogen gas supply unit 20 and the water heating heater 21. Accordingly, if by any chance the upper side pressure relief mechanism 5e deforms and scatters, the hydrogen gas supply unit 20 and the water heating heater 21 restrain an upward scattering of the upper side pressure relief mechanism 5e. The hydrogen gas supply unit 20 and the water heating heater 21 double as members to restrain the upward scattering of the upper side pressure relief mechanism 5e, thus ensuring the suppressed increase of components.

Furthermore, the front side pressure relief mechanism 5a, the left side pressure relief mechanism 5b, the rear side pressure relief mechanism 5c, the right side pressure relief mechanism 5d, and the upper side pressure relief mechanism 5e are the hydrogen ventilation openings including the respective hydrogen permeable membranes. Thus, the pressure relief mechanisms doubling as functions of the hydrogen ventilation openings ensure the suppressed increase of the number of components in association with an installation of the pressure relief mechanisms.

It should be noted that, in this embodiment, while the description has been made with an example of the hydrogen ventilation opening having the hydrogen permeable membrane as the pressure relief mechanism, the pressure relief mechanism may be a water proof sheet, a sheet metal cover, a sheet metal bracket, a resin sheet, or a rubber plug attached to the opening of the high voltage component housing portion 4b or a weakened portion, such as a cutout groove and a thin portion disposed in the high voltage component housing portion 4b, having a rigidity lower than those of other portions of the high voltage component housing portion 4b.

Not all the front side pressure relief mechanism 5a, the left side pressure relief mechanism 5b, the rear side pressure relief mechanism 5c, the right side pressure relief mechanism 5d, and the upper side pressure relief mechanism 5e are necessarily disposed, and it is only necessary that at least one of them is disposed. One of the pressure relief mechanisms is not necessarily disposed on each of the front, rear, right, and left sidewalls and the ceiling of the high voltage component housing portion 4b, and, for example, two pressure relief mechanisms may be disposed on each of the sidewalls and the ceiling. Furthermore, the auxiliary machines 10 may include a bracket for securing a high voltage cable and the wire harness, a resin protector for protecting the wire harness, and the like, other than the above-described components.

In this embodiment, pedestals for the auxiliary machines may be disposed on the high voltage component housing portion 4b. For example, the pedestals for securing the respective auxiliary machines are disposed on respective front, rear, right, and left external walls of the high voltage component housing portion 4b, and these pedestals are disposed so as to surround the pressure relief mechanisms (such as the front side pressure relief mechanism 5a, the left side pressure relief mechanism 5b, the rear side pressure relief mechanism 5c, and the right side pressure relief mechanism 5d) in a plan view. Accordingly, the auxiliary machines can be disposed around the pressure relief mechanisms so as to surround the pressure relief mechanisms, and therefore, the auxiliary machines can be used to restrain the pressure relief mechanisms from scattering in a lateral direction (such as a front-rear direction or/and a right-left direction).

In this embodiment, the wire harnesses used as the auxiliary machines may be disposed so as to surround the pressure relief mechanisms (such as the front side pressure relief mechanism 5a, the left side pressure relief mechanism 5b, the rear side pressure relief mechanism 5c, and the right side pressure relief mechanism 5d) in a plan view. Accordingly, the wire harnesses disposed around the pressure relief mechanisms can be used to further restrain the pressure relief mechanisms from scattering in the lateral direction (such as a front-rear direction or/and a right-left direction).

Although the embodiment of the present disclosure has been described in detail above, the present disclosure is not limited thereto, and can be subjected to various kinds of changes of design without departing from the spirit of the present disclosure described in the claims.

What is claimed is:

1. A fuel cell system including a fuel cell stack, the fuel cell system comprising:
    a housing case that includes a stack housing portion and a high voltage component housing portion, the stack housing portion housing the fuel cell stack, the high voltage component housing portion housing a high voltage component coupled to the fuel cell stack, the high voltage component housing portion being disposed above the stack housing portion, the high voltage component housing portion being configured to allow a gas to pass through between the high voltage component housing portion and the stack housing portion;
    a pressure relief mechanism disposed on the high voltage component housing portion of the housing case, the pressure relief mechanism being formed of a material having a rigidity lower than a rigidity of the high voltage component housing portion; and
    an auxiliary machine disposed outside the high voltage component housing portion of the housing case,
    wherein the pressure relief mechanism is disposed in a position opposed to the auxiliary machine so as to have a clearance with the auxiliary machine, and has a rigidity lower than a rigidity of the auxiliary machine.

2. The fuel cell system according to claim 1,
    wherein the high voltage component housing portion includes pedestals for the auxiliary machine, and
    wherein the pedestals are disposed so as to surround the pressure relief mechanism in a plan view.

3. The fuel cell system according to claim 1,
    wherein a wire harness is used as the auxiliary machine, the wire harness being disposed so as to surround the pressure relief mechanism in a plan view.

4. The fuel cell system according to claim 1,
    wherein the pressure relief mechanism is a hydrogen ventilation opening having a hydrogen permeable membrane.

* * * * *

UNITED STATES PATENT AND TRADEMARK OFFICE
CERTIFICATE OF CORRECTION

PATENT NO. : 10,777,826 B2  
APPLICATION NO. : 16/209283  
DATED : September 15, 2020  
INVENTOR(S) : Hiroki Sumikawa Page 1 of 1

It is certified that error appears in the above-identified patent and that said Letters Patent is hereby corrected as shown below:

On the Title Page

Item (72), inventor city, delete "Nisshin Aichi" and insert --Nisshin-shi Aichi--, therefor.

In the Specification

In Column 3, Line(s) 50, delete "portion' 4a" and insert --portion 4a--, therefor.

In Column 4, Line(s) 51, delete "side-pressure" and insert --side pressure--, therefor.

In Column 6, Line(s) 29, delete "water'heating" and insert --water heating--, therefor.

Signed and Sealed this  
Nineteenth Day of January, 2021

Andrei Iancu  
*Director of the United States Patent and Trademark Office*